United States Patent
Forrest

[11] 3,930,695
[45] Jan. 6, 1976

[54] RACE SECURING DEVICE

[75] Inventor: Richard E. Forrest, Lima, Ohio

[73] Assignee: Westinghouse Electric Corporation, Pittsburgh, Pa.

[22] Filed: Sept. 25, 1974

[21] Appl. No.: 509,167

[52] U.S. Cl. .................... 308/236; 85/4; 295/48
[51] Int. Cl.² F16B 37/00; F16C 33/30; F16C 41/00; F16C 43/00
[58] Field of Search ............ 36/42; 85/4; 295/36 R, 295/42, 44, 45, 48; 308/236, 121

[56] References Cited
UNITED STATES PATENTS

| | | | |
|---|---|---|---|
| 1,375,671 | 4/1921 | Cerf | 36/42 |
| 1,669,725 | 5/1928 | Scribner | 308/236 X |
| 1,812,973 | 7/1931 | Miller | 308/236 X |
| 1,840,412 | 1/1932 | Sanford | 295/44 |
| 2,837,382 | 6/1958 | Schaefer | 308/236 |
| 2,891,829 | 6/1959 | Irvin | 308/236 |
| 3,147,050 | 9/1964 | Wulfert et al. | 308/236 |

Primary Examiner—M. Henson Wood, Jr.
Assistant Examiner—Howard Beltran
Attorney, Agent, or Firm—G. H. Telfer

[57] ABSTRACT

A bearing lock is provided which can be inserted, tightened, and removed from the exterior of a rotating machine without disassembly of the end bell of the machine. Positive guiding means insure that the locking portion will only engage a bearing outer race. A portion of the bearing lock comprises a lever which turns about a housing portion fulcrum as a tightening means is torqued. As the locking member is displaced, an angular extension of the lock is drawn into engagement with the outer race and transmits an axially directed force thereon. When secured in operating position, the body of the lock has minimal axial projection thereby avoiding interference with adjacent structure.

5 Claims, 5 Drawing Figures

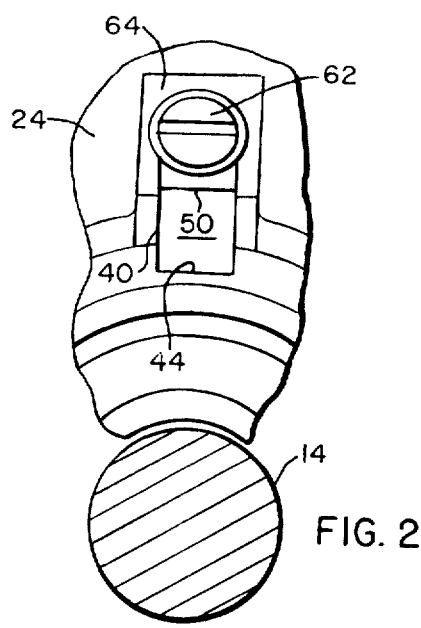
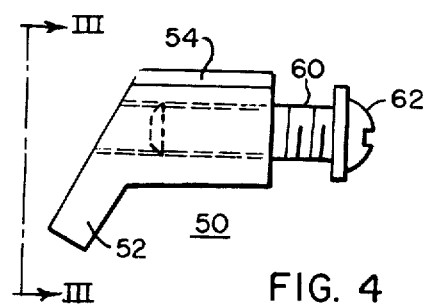
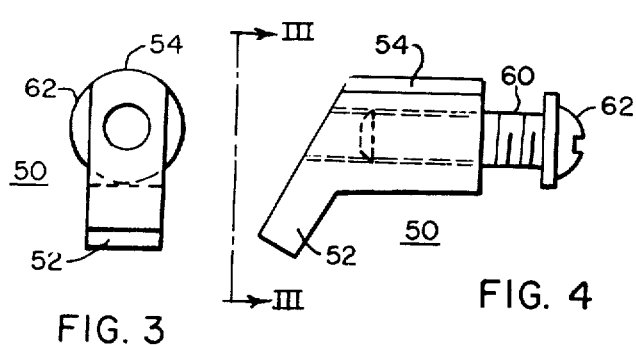
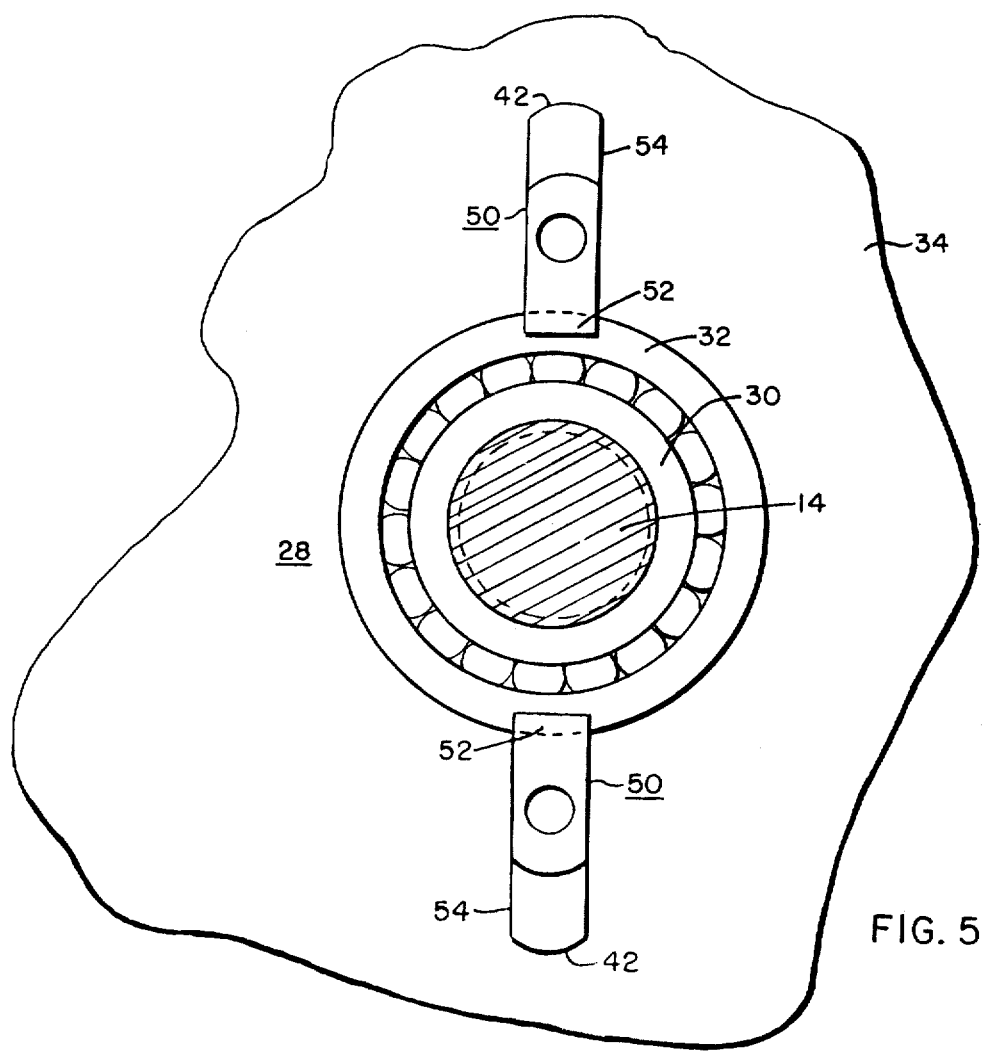

RACE SECURING DEVICE

BACKGROUND OF THE INVENTION

1. Field of the Invention

This invention relates to bearing lock construction and, more particularly, to an improved bearing lock for confining a bearing within the end bell of a dynamoelectric machine.

2. Description of the Prior Art

In the usual construction of dynamoelectric machines a rotor is secured to a shaft which is journalled for rotation within an annular stator. To properly locate the rotor with respect to the stator, the rotating shaft must be substantially free from radial movement so that a uniform air gap is maintained. In most machines the air gas is very small; therefore, the shaft must be supported by means which will maintain close tolerances.

It has been customary to obtain proper shaft position and close tolerances by the use of "anti-friction" bearings of a type such as a ball bearing which has an inner race, an outer race, and rolling elements therebetween. One such bearing, which carries the thrust load, is mounted in fixed position whereby the bearing inner race is fastened axially on the shaft and the outer race is held axially in the housing. The opposite bearing is fastened axially to the shaft but "floats" in the housing. To assure proper movement, the rotating inner race must have an interference fit on the shaft while the stationary part has a sliding fit with the housing. Normally, electric motors have a revolving shaft upon which the bearings are "pressed" in an interference fit, while the housing fit is loose enough to allow the bearings to be assembled in operating position.

After the thrust load bearing is assembled in operating position, the outer race of the bearing must be secured within its seat in the end bell of the machine housing. Otherwise, the outer race of the bearing will slip and vibrate within its seat as the shaft rotates. This action generates frictional heat or "fretting" corrosion and results in excessive wear of the bearing assembly. In addition, undesirable axial displacement or "end play" of the shaft is prevented when the outer race of the bearing is properly secured in its seat.

Various locking devices are presently employed to confine the bearing assembly within its seat in the machine end bell structure, including end brackets, clamping plates, lock washers and lock nuts, snap rings, stakes, pivotal latching members, and L-shaped locking dogs, all of which must be assembled and tightened prior to installation of the shaft within the end bell. These devices have, in general, proved to be satisfactory in those machines in which preassembly is possible. However, some machines have a structure such as a ventilation fan pressed upon the shaft and lying adjacent to the bearing assembly which prevents preassembly of the locking device. In such machines there is not enough axial clearance between the structure and the end bell to insert, position, and tighten prior art fastening devices against the outer race of the bearing prior to the final assembly.

One existing design which overcomes this problem in part has been suggested by Wulfert U.S. Pat. No. 3,147,050 in which a threaded bearing holding means, disposed in an extended hub portion within which a bearing is seated, engages an outer bearing race along an inclined axis and is accessible through an opening in the housing, thus permitting tightening of the bearing after final assembly of the machine. Since the bearing locking means is carried within a threaded recess of the extended hub portion, the problem of external insertion of a fastening means through an opening of limited clearance is avoided. However, depending upon the configuration of adjacent structure (such as a fan), it may not be possible to engage the threaded bearing holding means as taught by Wulfert. Furthermore, even assuming that such bearing holding means could be engaged and tightened externally, a radial load would be imposed upon the bearing assembly since the bearing holding means is inclined along an acute angle with respect to the shaft axis. This additional radial loading disturbs the preload stability of the bearing assembly, thus decreasing bearing life.

The Irvin U.S. Pat. No. 2,891,829, assigned to the assignee of the present invention, overcomes the objections to Wulfert's device. The locking device taught by Irvin comprises an L-shaped member which is disposed within an end bell portion and is positively guided and retained in bearing locking position. It has minimal projection behind the bearing assembly, thus allowing a structure such as the rotor or fan to be located very close to the bearing assembly without interference. As the locking nut on the threaded end of the L-shaped locking member is torqued, a tang on its opposite end imparts an axially directed force against an outer bearing race, thus holding it securely within its seat without imposing radial loading. The L-shaped locking member, which is carried within the end bell portion, is fixed in a non-interfering position prior to assembly and can be operated from the exterior side of the end bell after the bearing is positioned within its seat. The principal disadvantage of the locking device of Irvin is that, although guiding means are provided, it is possible to draw the locking member against the end bell instead of the outer race of the bearing. This condition has been found to occur when the locking member is torqued and vaulted over a first stop and is subsequently rotated away from the bearing race until it engages a second stop, thereby completely overlying an end bell portion instead of the outer race of the bearing. Such a condition would remain undetected since the locking operation is not visible from the exterior of the machine. A second disadvantage of the locking device of Irvin is that it can only be installed or removed when the end bell is disassembled from the machine; that is, it cannot be inserted into or withdrawn from the end bell after the machine has been completely assembled. The usual procedures of testing, disassembly, repair or adjustment, and reassembly of the machine could obviously be performed more easily and rapidly if the locking means could be inserted, positioned, and secured from the machine exterior after final assembly and testing.

It is, therefore, desirable to provide a simple bearing confining means which can be inserted or removed from the exterior of the machine without requiring disassembly of the end bell. Such locking means should have minimal axial projection so as to avoid interference with adjacent structure. Furthermore, the locking means should not impose radial loading upon the bearing assembly or disturb the radial preloading of the bearing assembly in any way. Finally, positive guiding means should be provided to insure that the locking means will only engage the bearing outer race. The invention described herein accomplishes these desired

SUMMARY OF THE INVENTION

The present invention discloses an improved locking device for confining a bearing within an end bell of a rotating dynamoelectric machine, such as an electric motor. The locking device may be inserted and tightened or removed from the exterior of the machine without disassembly of the end bell. Positive guiding means assure that the locking portion of the device will only engage an outer race portion of the bearing. The locking portion directs an axial force upon the outer race thereby avoiding radial loading of the bearing assembly. The body of the locking device has minimal axial projection which permits close assembly of other structure.

These improvements are realized in a bearing locking device whose structure includes an elongated nut having a tang or angular extension for engaging a bearing race and a tapped receptacle for engaging a threaded tightening means. The structure is formed with a rounded upper portion, a rectangular lower portion, and parallel sides. The profile thus formed prescribes a singular method for insertion of the locking device into a conforming recess of an end bell portion. The exterior face of the conforming recess, while admitting the body of the nut and its angular extension, serves as a stop and torquing platform for an upper portion of the threaded tightening means. The exterior face of the conforming recess comprises a ramp which is inclined in such a manner that, as the tightening means is torqued, the nut is drawn in sliding contact with the rounded upper surface of the conforming recess while its angular extension is drawn into engagement with an outer race of the bearing assembly. Further application of torque to the tightening means produces a force against the ramp and the rounded upper portion of the nut; the force applied to the body of the nut is transmitted to the bearing race through the lever-fulcrum combination established by the junction of the body of the nut with the rounded upper surface of the conforming recess. The lock may be disengaged and removed from the end bell simply by loosening the tightening means, rotating the body of the nut until its rounded upper portion lies flush within the conforming recess, and withdrawing the locking assembly from the conforming recess.

BRIEF DESCRIPTION OF THE DRAWINGS

FIG. 2 is a sectional view on line II—II of FIG. 1;

FIG. 3 is a view on line III—III of FIG. 4 showing the present invention in profile;

FIG. 4 is a side elevational view of the present invention; and

FIG. 5 is a sectional view on line V—V of FIG. 1.

DESCRIPTION OF THE PREFERRED EMBODIMENT

Figure 1:
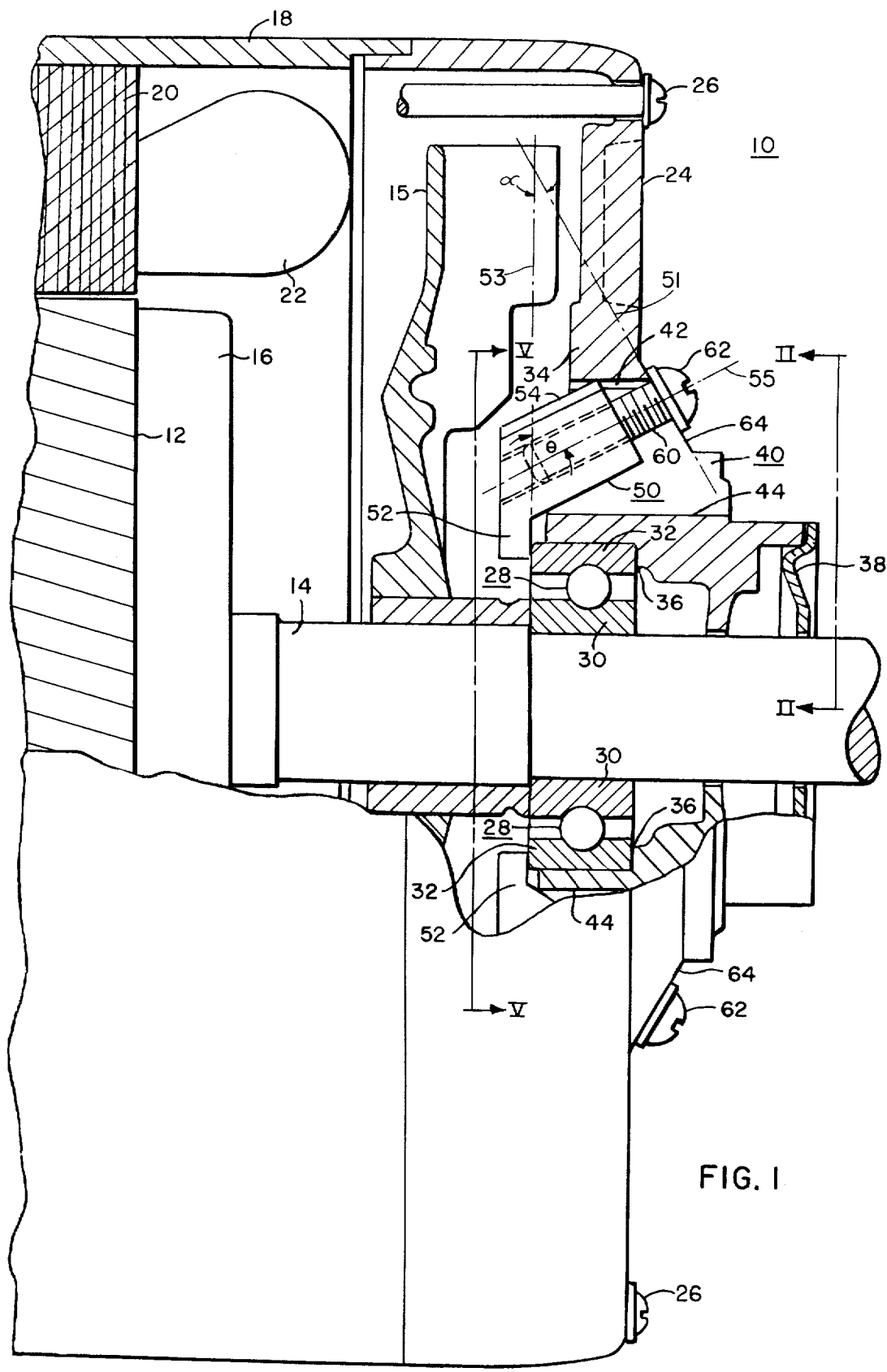
FIG. 1 is a side elevational view, partly in section, of a dynamoelectric machine in which the present invention has been incorporated.

Throughout the description which follows, like reference characters refer to like elements on all Figures of the drawings.

Referring now to the drawings, there is shown in FIG. 1 a dynamoelectric machine 10 having a rotor 12 mounted on a shaft 14. The rotor 12 is shown as being of the squirrel cage type including a plurality of laminations in which squirrel cage bars (not shown) are positioned in suitable slots and are connected by end rings 16. The machine 10 has the usual cylindrical stator frame 18 in which is supported a laminated stator core 20 of any suitable, or usual, construction. Suitable stator windings 22 are placed in slots in the core 20 in the usual manner. An end bell 24 is secured to the stator frame 18 in any desired manner, as for example, by through bolts 26 as shown in FIG. 1. The rotor shaft 14 is supported for rotation in the end bell 24 by a ball bearing 28 having an inner race 30 pressed on the shaft 14 and an outer race 32. The inner side of the end bell 24 has a central hub 34 provided with a central bearing seat 36. The bearing 28 is held in the bearing seat 36 in a manner to be hereinafter described. A fan 15 is also pressed on shaft 14 and lies adjacent to ball bearing 28. A dust cap 38 is provided on the outside of the end bell 24 to cover the shaft receiving opening.

The present invention provides a unique construction for confining the bearing 28 in the bearing seat 36. Two lock receiving slots 40, preferably die cast, are provided in the end bell 24 through the hub 34 just outside the bearing seat 36. The slots 40 extend axially from the inner side to the outer side of the end bell 24 and are displaced 180° from each other as shown in FIG. 5. The outer portion of the end bell 24, as shown in FIGS. 1 and 2, defines the lock receiving slot exterior opening 40 and is formed into a ramp surface 64. Shown in assembled position is a locking assembly 50, one portion of which is a tang 52 which engages the outer race 32 in surface-to-surface contact. The ramp surface 64 is inclined along a plane 51 in a predetermined angle $\alpha$ with respect to the plane 53 defined by the union of the tang 52 with the outer race 32. The tang 52, an extension of a nut 54, is inclined in a predetermined angle $\theta$ with respect to the axis 55 the nut 54 such that it is disposed for surface-to-surface contact with the bearing race 32 as a shoulder portion of the nut 54 is brought into line-to-line sliding contact with the lock receiving slot 40. To insure that only an axial force is directed upon the outer race 32 by the tang 52, the sum of the angle of inclination $\theta$ of the tang 52 and the angle of inclination $\alpha$ of the ramp surface 64 should equal 90°.

A threaded portion of a tightening bolt 60 is shown in threaded engagement with the nut 54. A torque receiving portion 62 of the tightening bolt 60 is shown in surface-to-surface contact with the ramp surface 64. As shown in FIGS. 2 and 3, the diameter of the torque receiving portion 62 of the tightening bolt 60 is larger than the width of the lock receiving slot 40 but is slightly smaller than the width of the ramp surface 64.

Upon rotation of the tightening bolt 60, the lever 54 of the locking assembly 50 is drawn into line-to-line contact with an upper portion 42 of the lock receiving slot 40 as the tang is drawn into surface-to-surface contact with the outer race 32. Further application of torque to the torque receiving portions 62 of the tightening bolt 60 produces a force against the ramp surface 64 and the nut 54. This force is transmitted to the outer race 32 of bearing 28 through tang 52 by means of the lever-fulcrum combination established by the junction of the rounded shoulder portion of the nut 54 and the upper portion 42 of the lock receiving slot 40. When the bolt 60 is tightened, ball bearing 28 is held firmly in position.

Referring now to FIGS. 3 and 4, the construction of locking assembly 50 is illustrated. The nut 54 of the locking member 50 has a centrally disposed, tapped recess for receiving the tightening bolt 60. The upper portion of the nut 54 is rounded in profile and is adapted for sliding engagement with the conforming upper portion 42 of lock receiving slot 40. The lower portion of the nut 54 is rectangular in profile and is joined with the tang 52 which is an angular extension of the rectangular lower portion of the nut 54. The lower portion 44 of the lock receiving slot 40 is also rectangular in profile and is adapted for sliding contact with the tang 52 as it is inserted therein.

Because the lock receiving slot 40 is not symmetrical about both of its principal centerlines, the locking assembly 50 can be inserted in only one manner; that is, the locking assembly 50 can only be inserted when the rounded surface of the nut 54 is aligned with the conforming rounded upper portion 42 of lock receiving slot 40 and the tang 52 is aligned with the conforming rectangular lower portion 44 of lock receiving slot 40. When the locking assembly 50 is properly aligned and is inserted through lock receiving slot 40, the tang 52 is brought into surface-to-surface contact with the outer race 32 as the locking assembly is rotated axially within the slot. The dimensions of the tang 52 and the nut 54 are sufficient to assure that the tang 52 overlies the outer race 32 as the rounded shoulder portion of the nut 54 is drawn into line-to-line contact with the upper portion 42 of the lock receiving slot 40.

The machine 10 is assembled by pressing the ball bearing 28 and the fan 15 on the shaft 14. The rotor 12 is positioned within the stator core 20 and the end bell 24 is then assembled to the stator frame 18. The ball bearing 28 slides into the bearing seat 36 and the through bolts 26 are then tightened. When the machine assembly is completed and the ball bearing 28 is seated in the bearing seat 36, the bearing may be locked by inserting the locking assembly 50 into the exterior opening of lock receiving slot 40 until the tang 52 drops down and engages the outer race 32 of the ball bearing 28. The tightening bolt 60 is then suitably torqued until tang 52 is forced securely against the outer race 32. The tang 52 cannot move away from contact with the bearing outer race 32 as the bolt 60 is tightened since the radial walls of lock receiving slot 40 prevent circumferential rotation of the nut 54. Upon completion of the tightening operation, the bearing 28 is firmly held by the locking assembly 50 in two positions 180° apart as shown in FIG. 5.

The locking assembly 50 may be removed from the end bell 24 while the machine 10 is completely assembled. The removal procedure is essentially the reverse of the installation procedure; that is, the tightening bolt is loosened until the nut 54 can be rotated within the lock receiving slot 40 so that the rounded portion of the nut 54 lies flush with the conforming upper portion 42 of the lock receiving slot 40 and the edge of tang 52 lies in line-to-line contact with a rectangular lower portion 44 of the lock receiving slot 40. The locking assembly 50 is then properly positioned for withdrawal from the end bell 24.

From the foregoing description, taken with the drawings, it is seen that this invention has provided a new, improved, and effective arrangement for confining a bearing within the end bell of a rotating machine.

I claim:

1. A bearing lock for confining a bearing within an end bell of a dynamoelectric machine, said bearing having an inner race, an outer race, and rolling elements therebetween, said end bell including an interior hub, said hub having a recessed seat adapted to receive said bearing and having an opening extending through said hub to an accessible exterior side of said end bell, said opening being adapted to receive said lock, comprising:

a nut having a shoulder portion in engagement with said hub and having a tang in engagement with said outer race of said bearing, said shoulder portion being in threaded engagement with a bolt, a predetermined portion of said hub being operable as a fulcrum for transmitting a mechanical force from said hub through said shoulder portion and said tang of said nut to said outer race of said bearing when assembled.

2. The bearing lock of claim 1 wherein a portion of said accessible exterior side of said end bell is formed into a planar surface, said planar surface being inclined in a predetermined angle $\alpha$ with respect to the plane defined by the surface-to-surface union of said tang and said outer race of said bearing.

3. The device bearing lock of claim 2 wherein said tang is inclined in a predetermined angle $\theta$ with respect to the axis of said nut, the sum of $\alpha$ and $\theta$ being approximately a right angle.

4. The bearing lock of claim 1 wherein the periphery of said opening is disposed within said planar surface and is defined by a plurality of intersecting surfaces wherein at least one of said intersecting surfaces is substantially planar.

5. The bearing lock of claim 1 wherein said opening is defined by two parallel planar surfaces which intersect at right angles with a third planar surface, said parallel planar surfaces also intersecting with an arcuately shaped surface.

* * * * *